United States Patent
Tann et al.

(10) Patent No.: US 9,761,202 B2
(45) Date of Patent: Sep. 12, 2017

(54) SEAMLESS VIDEO TRANSITIONS

(71) Applicant: Apple Inc., Cupertino, CA (US)

(72) Inventors: Christopher P. Tann, San Jose, CA (US); Ruchi Wadhawan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/061,534

(22) Filed: Mar. 4, 2016

(65) Prior Publication Data

US 2016/0267881 A1  Sep. 15, 2016

Related U.S. Application Data

(60) Provisional application No. 62/130,524, filed on Mar. 9, 2015.

(51) Int. Cl.
*G09G 5/18* (2006.01)
*G09G 5/393* (2006.01)
*G06F 1/32* (2006.01)
*G09G 5/00* (2006.01)
*G09G 5/36* (2006.01)

(52) U.S. Cl.
CPC .......... *G09G 5/18* (2013.01); *G06F 1/3265* (2013.01); *G09G 5/005* (2013.01); *G09G 5/393* (2013.01); *G09G 5/006* (2013.01); *G09G 5/36* (2013.01); *G09G 2340/0407* (2013.01); *G09G 2340/0435* (2013.01); *G09G 2340/0492* (2013.01); *G09G 2360/02* (2013.01); *G09G 2360/18* (2013.01); *G09G 2370/04* (2013.01); *Y02B 60/1242* (2013.01)

(58) Field of Classification Search
None
See application file for complete search history.

(56) References Cited

U.S. PATENT DOCUMENTS

| | | | |
|---|---|---|---|
| 2001/0015769 A1* | 8/2001 | Yamazaki | G09G 1/167 348/554 |
| 2010/0214254 A1* | 8/2010 | Tsai | G06F 1/3262 345/174 |
| 2012/0206461 A1 | 8/2012 | Wyatt et al. | |
| 2012/0317607 A1 | 12/2012 | Wyatt et al. | |
| 2013/0235014 A1* | 9/2013 | Lee | G06F 1/32 345/211 |

(Continued)

*Primary Examiner* — Joni Richer
(74) *Attorney, Agent, or Firm* — McDermott Will & Emery LLP

(57) ABSTRACT

This application relates to performing seamless video transitions at a display panel when a video stream changes resolution and/or scale. The video stream can be provided by a host device to a timing controller (TCON). When a parameter of the video stream is going to change, the host device can cause the TCON to enter a panel self refresh (PSR) mode. During the PSR mode, the TCON can drive the display panel using an image frame stored in a memory of the TCON. Additionally, during the PSR mode, the host device can adjust a scaler and/or resolution associated with the TCON. Once the host device has finished adjusting the TCON, the TCON can exit the PSR mode and the host device can provide a new data stream to the TCON without any apparent display artifacts being output by the display panel.

20 Claims, 6 Drawing Sheets

(56) References Cited

U.S. PATENT DOCUMENTS

| | | | |
|---|---|---|---|
| 2013/0300723 A1* | 11/2013 | Wu | G09G 5/18 |
| | | | 345/212 |
| 2015/0103104 A1* | 4/2015 | Lee | G09G 3/3648 |
| | | | 345/690 |
| 2015/0172590 A1 | 6/2015 | Wang et al. | |
| 2016/0117995 A1* | 4/2016 | Lee | G09G 3/20 |
| | | | 345/691 |

* cited by examiner

SEAMLESS VIDEO TRANSITIONS

CROSS-REFERENCE TO RELATED APPLICATIONS

The present application claims the benefit of U.S. Provisional Application No. 62/130,524, entitled "SEAMLESS VIDEO TRANSITIONS" filed Mar. 9, 2015, the content of which is incorporated herein by reference in its entirety for all purposes.

FIELD

The described embodiments relate generally to controlling video transitions at a display panel. More particularly, the present embodiments relate to transitioning a timing controller into a panel self refresh mode while a change in resolution is made to a video stream. In this way, the change in video resolution will appear seamless.

BACKGROUND

Display panels of computing devices can provide a variety of video streams whose parameters can be adjusted during the playback of a video stream. Unfortunately, certain display artifacts can be visible when such parameters are adjusted during video playback. For example, modifying the resolution of a video stream can cause artifacts such as blanking and distortion to occur. As a result, certain portions of a video stream may not be visible to a user, which can impair the user experience. Additionally, such artifacts can result in video processing times being extended in order to mitigate such artifacts, thereby creating processing inefficiencies.

SUMMARY

This paper describes various embodiments that relate to systems, methods, and apparatus for performing seamless video transitions. In some embodiments, a method is set forth for transitioning resolution of a display device while a video stream is being output by the display device. The method can include steps of sending a first video stream to a timing controller, and transitioning the timing controller of the display device into a panel self refresh mode. The method can also include steps of ceasing sending the first video stream to the timing controller, reconfiguring a scalar parameter of the timing controller, and transitioning the timing controller out of the panel self refresh mode. Additionally, the method can include sending a second video stream to the timing controller. In some embodiments, a final frame of the first video stream corresponds to a scaled version of an initial frame of the second video stream in order to effectuate a seamless video transition at the display device. Furthermore, the first video stream can have a different resolution than the second video stream.

In other embodiments, a computing device is set forth. The computing device can include a display panel, and a timing controller (TCON) in communication with the display panel. The TCON can include a scaler component or scaler logic circuit. The computing device can also include a host device in communication with the TCON. The host device can be configured to modify the scaler of the TCON when the TCON is operating in a panel self refresh (PSR) mode. Additionally, the host device can be further configured to provide a video stream to the TCON before the TCON is operating in the PSR mode and bypass providing the video stream to the TCON when the TCON is operating in the PSR mode. The computing device can also include a memory. The host device can be configured to provide an image frame to the TCON for storage in the memory in order that the TCON will drive the display panel with the image frame while operating in the PSR mode.

In yet other embodiments, a system is set forth. The system can include a timing controller (TCON) comprising a memory and configured to operate in panel self refresh (PSR) mode wherein an image frame stored in memory is output by the TCON. The system can also include a host device in communication with the TCON and configured to cause the TCON to transition into the PSR mode before a parameter of a video stream output by the host device changes. The parameter of the video stream can include a resolution of the video stream and the image frame can be provided by the host device to the TCON before the parameter of the video stream changes. The TCON can include a scaler and the host device can be configured to modify the scaler when the TCON is operating in the PSR mode. Additionally, the TCON can include a first clock signal control configured to provide a first clock signal for driving the TCON when the TCON is not operating in the PSR mode, and a second clock control signal configured to provide a second clock signal for driving the TCON when the TCON is operating in the PSR mode.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
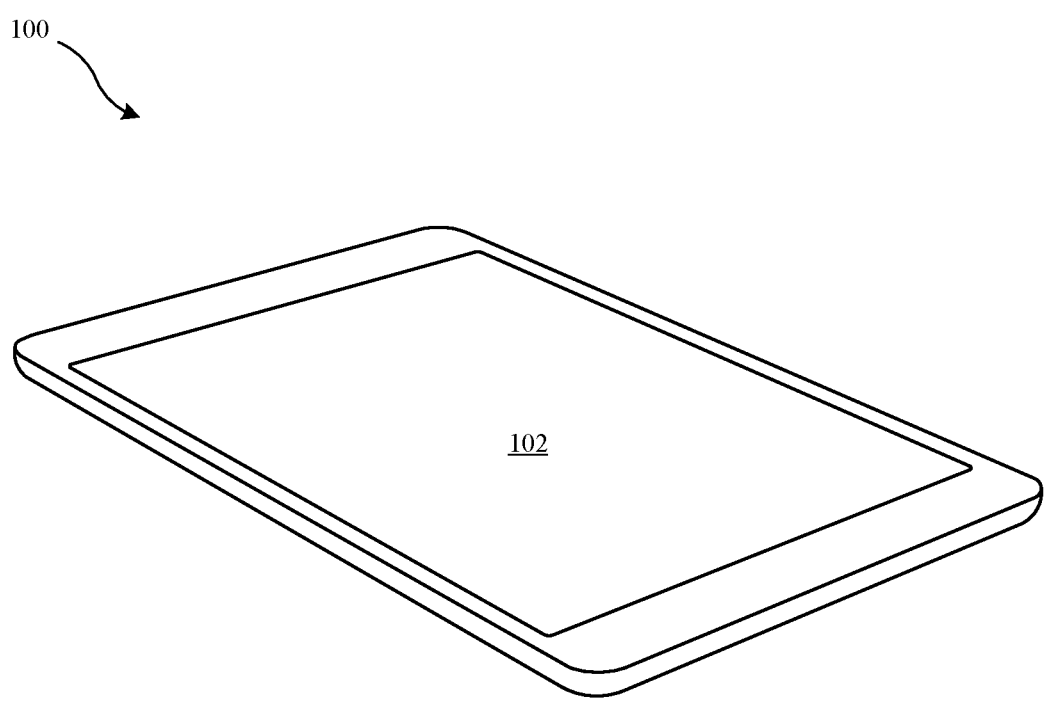
FIG. 1 shows a perspective view of a computing device that can include the host device and timing controller discussed herein for performing seamless video transitions.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application relates to systems, methods, and apparatus for performing seamless video transitions. Video transitions can occur when one or more parameters of a video stream are modified during the video stream. The parameters can include one or more dimensions of the video and/or the resolution of the video. For example, a display device of a computing device can output a video stream having certain dimensions corresponding to a user interface of the computing device. When the dimensions of the user interface are adjusted, the dimensions or scale of the video stream can change. Additionally, a resolution of the video stream can change as a result of a user selecting a setting for a video stream, or as a result of action taken by software of the computing device. If the display device is not equipped to effectively handle such parameter changes to the video stream, display artifacts can occur thereby resulting in the degradation of the user experience. Such display artifacts can include pauses, stuttering, and noise, among others. In order to prevent such display artifacts from occurring during video streams, software and hardware of a computing device can be used ensure that video transitions are executed without interruption. For example, a host device such as a graphics processing unit (GPU) can provide video stream data along with other data for performing seamless video transitions. Additionally, a timing controller (TCON) can be in communication with the host device and receive indications from the host device corresponding to upcoming video transitions. The host device can provide an indication to the TCON that a video transition is going to occur during the video stream and also provide an image frame to be stored in a memory of the TCON and used by the TCON until the video transition is complete. In this way, the TCON will be operating in a panel self refresh (PSR) mode during the video transition. During the PSR mode, the TCON will effectively be driving a display panel of the display device with the image frame stored in the memory until the host device indicates to the TCON that the video transition has completed. A final image frame from the host device during the video transition can include similar features as the image frame provided by the host device when the video transition was initiated. For example, the initial image frame and the final image frame can be different versions of the same base image. The final image frame can have a different resolution than the initial image frame, and/or the final image frame can have different dimensions than the initial image frame. The base image from which the final image frame and the initial frame are based can be a solid color, a patterned image, a dynamic image that correlates to the images in the video stream, or any other suitable image for outputting during a video transition.

The system for performing the video transitions described herein can incorporate a TCON that includes a frame buffer (e.g., a memory) that acts as a first input first output (FIFO) interface between the input and the output to the TCON. The input can correspond to a video input to the TCON having a first resolution and the output can correspond to a video output having a second resolution. Changes in resolution can be controlled in part by at least two independent clock signals of the TCON. A first clock controller can be connected to a scaler of the TCON and to the host device (e.g., the GPU), and/or an interface between the TCON and the host device. The first clock controller can also be connected to a panel buffer manager (PBM) of the TCON. A second clock controller can be connected to the PBM. However, it should be noted that other arrangements of the clock controllers can be provided in order to effectuate the seamless video transitions described herein. Each clock controller can include a phase lock loop (PLL) for controlling clock signal frequency, and can provide the same or different clock signals at any given time in order to create a synchronous or asynchronous FIFO between the input and the output of the TCON. During a video transition, the TCON can enter the PSR mode and the PBM can drive the display panel from memory of the TCON during the PSR mode. Because the second clock controller is connected to the PBM, the PBM is able to drive the display panel according an updated clock signal until the video stream from the host device has completely transitioned. During the video transition, the host device can reconfigure the scaler of the TCON and/or a resolution setting of the TCON. Once the video stream has completely transitioned, the TCON can exit the PSR mode and the video stream from the host device can be provided to the display panel.

Entering and exiting the PSR mode can be controlled by the host device using predetermined messages. The predetermined messages can be an arrangement of bits that correspond to either a command to the TCON to enter the PSR mode or a command to the TCON to exit the PSR mode. One or more of the messages can be accompanied by an image frame for storage by the PBM, as discussed herein. In some embodiments, the host device can bypass sending messages and merely configure the scaler or resolution setting of the TCON while also providing an image frame for use by the PBM during the video transition. The TCON can detect video parameters of the video stream from the host device and configure the scaler according to the video parameters. For example, the video parameters can correspond to an instruction to bypass the scaler, change a scaling of the scaler, and/or change a resolution associated with the TCON. Detection of the video parameters by the TCON can be performed using a threshold scheme. For example, when a signal from the host device is equal to, above, or below one or more thresholds managed by the TCON, the scaler of the TCON can be bypassed, down scaled, or up scaled. In this way, configuration of the TCON can be controlled by in part by signals from the host device.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a computing device 100 having a display panel 102. The display panel 102 can be a display panel that employs a pixel array or light emitting diode (LED) array to output light at the display panel 102. It should be noted that the computing device 100 can be a laptop computing device, desktop computing device, tablet computing device, media player, accessory device, cellular phone, television, or any other electronic device incorporating an (organic light emitting diode) OLED display, (light emitting diode) LED display panel, and/or liquid crystal display (LCD). The computing device 100 can incorporate one or more processors and controllers for displaying videos at the display panel 102. For example, the computing device 100 can include a host device such as a graphics processing unit (GPU) and a display controller such as a timing controller (TCON) in order to assist in the display panel 102 in outputting a video stream. During video playback, parameters of a video stream, such as resolution, can change as a result of a user operating the computing device 100, a software function of the computing device 100, bit rate of a video download changing, and/or any other operation that can change a video parameter. As a result, artifacts can appear at the display panel 102, which can obstruct the video stream. In order to allow for the seamless transitions when a video parameter is modified, the host device and timing controller can be arranged to follow certain protocols during a video transition, as discussed herein.

Figure 2A:
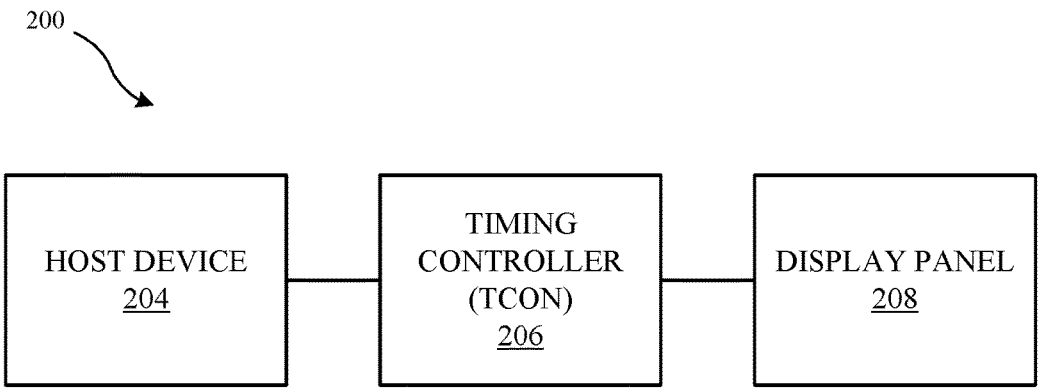
FIGS. 2A and 2B illustrate system diagrams of a host device and a timing controller that can be used to perform seamless video transitions as discussed herein.
Figure 2B:
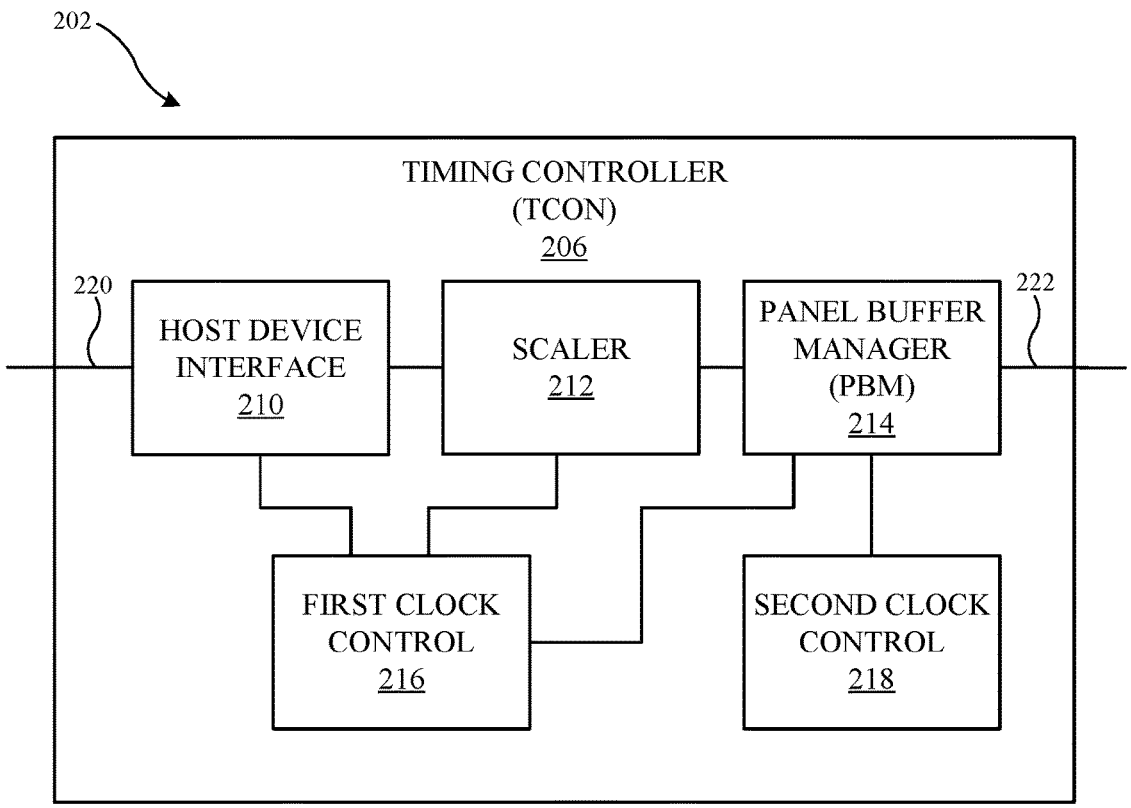

FIG. 2A illustrates a system diagram 200 for performing seamless video transitions as discussed herein. The system diagram 200 includes a host device 204, a timing controller (TCON) 206, and a display panel 208. It should be noted that display panel 208 can be the display panel 102 of the computing device 100 provided in FIG. 1. The host device 204 can be a GPU that provides image data and other signals to the TCON 206. FIG. 2B illustrates a system diagram 202 of the TCON 206 having a host device connection 220 and a display panel connection 222. The host device 204 can control various parameters of the image data provided to the TCON 206, such as resolution, scale, and/or frame rate. The host device 204 can also provide signals corresponding to instructions for the TCON 206. The instructions can cause the TCON 206 to adjust a scaler 212 of the TCON 206 and/or cause the TCON 206 to transition into one or more different operating modes. For example, the host device 204 can provide a first signal to a host interface 210 of the TCON 206 indicating that the resolution of the video stream to the TCON 206 is going to change. The first signal can be accompanied by a final image frame that is to be stored by a panel buffer manager (PBM) 214 of the TCON 206. The TCON 206 can send back an acknowledgement in response to receiving the first signal and enter a panel self refresh (PSR) mode.

During the PSR mode, the PBM 214 will drive the display panel 208 using the final image frame from the host device 204. However, in some embodiments, the TCON 206 can drive the display panel 208 using an image frame that is stored by the TCON 206 and not necessarily provided by the host device 204 with the first signal. Rather, the TCON 206 can generate the image frame in response to receiving the first signal from the host device 204. While in the PSR mode, the TCON 206 can be arranged such that the scaler 212 is bypassed. This allows the scaler 212 to be adjusted without interrupting the operation of the display panel 208. Adjustments to the scaler 212 can include scaling up or scaling down an amount of data provided by the scaler 212. While the scaler 212 is bypassed, the PBM 214 can drive the display panel 208. The TCON 206 can include at least two clock signals, a first clock control 216 and a second clock control 218, generated by two independent clock controls. Each of the first clock control 216 and the second clock control 218 can include a phase lock loop (PLL) for controlling a frequency and/or duty cycle of each respective clock signal provided by the first clock control 216 and the second clock control 218. In this way, when the first clock control 216 and/or the scaler 212 are being adjusted by the host device 204 during the PSR mode to prepare for a change in the video stream, the second clock control 218 can provide the clock signal for the PBM 214. Having two independent clock signals allows the TCON 206 to act as an asynchronous first input first output (FIFO) device whereby the final image provided before the video transition and PSR mode is the first image provided to the display panel 208 once the TCON 206 has transitioned into the PSR mode.

Once the video transition has completed and the scaler 212 and/or the first clock control 216 have been reconfigured, an initial image frame received at the TCON 206 will be the first image provided to the display panel 208 once the TCON 206 exits the PSR mode. The final image frame and the initial image frame can be different images that are based on a similar image pattern. For example, the final image frame can have a different resolution and/or different dimensions than the initial image frame. Furthermore, the final image frame and the initial image frame provided by the host device 204 can be a solid color or pattern that would not appear different to a user when the solid color or pattern changes in dimensions or resolution. Instructions encoded in the signals from the host device 204 to the TCON 206 can be used to control the scaler 212, the first clock control 216, the second clock control 218, and/or the PBM 214. For example, the host device 204 can cause the PBM 214 to store a certain image frame during a video transition and/or cause the second clock control 218 to change a frequency of a clock signal that the second clock control 218 is providing to the PBM 214.

Communications can be sent from the TCON 206 to the host device 204 in order to provide certain confirmations to the host device 204. For example, the TCON 206 can send an acknowledgement to the host device 204 in response to receiving an indication from the host device 204 that the a parameter of a video stream from the host device 204 will change. Additionally, once the TCON 206 has successfully transitioned into the PSR mode, the TCON 206 can send a signal to the host device 204 confirming that the TCON 206 is now in the PSR mode. This allows the host device 204 to begin reconfiguring the TCON 206 based on one or more new video parameters in order to prepare the TCON 206 for receiving a new video stream. Once the host device 204 has completed reconfiguring the TCON 206, the host device 204 can send a signal corresponding to an instruction to exit the PSR mode. Once the TCON 206 has exited the PSR mode in response to receiving the instruction to exit, the TCON 206 can send a confirmation signal back to the host device 204 indicating that the TCON 206 has successfully exited the PSR mode. In response, the host device 204 can begin sending a new video stream that is defined at least in part by a new video parameter.

Figure 3:
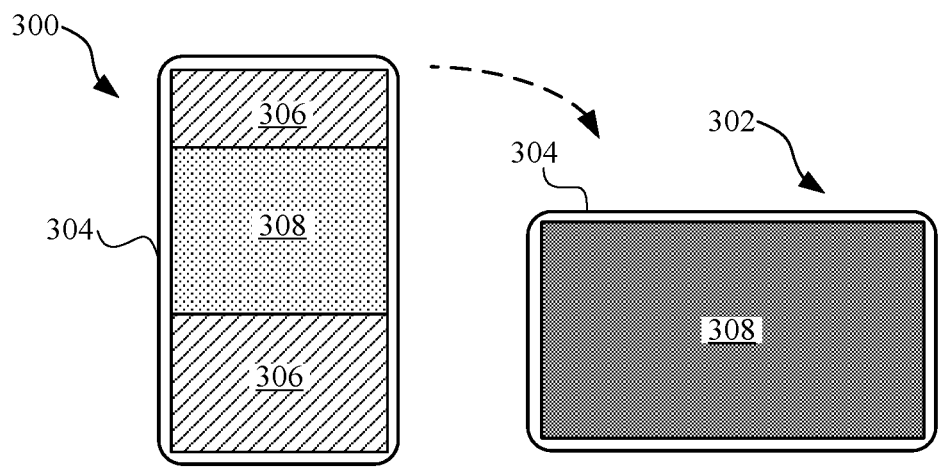
FIGS. 3-5 illustrate examples of when a video transition can occur.

FIG. 3 illustrates a scenario where a computing device 304 changes resolution and/or scale when the size of an application interface 308 scales or otherwise changes dimensions. It should be noted that computing device 304 can be the computing device 100 of FIG. 1 discussed herein. A first state 300 of the computing device 304 illustrates the computing device 304 providing an application interface 308 adjacent to other display areas 306. At a second state 302 of the computing device 304, an area of the application interface 308 is scaled up or otherwise made larger compared to the first state 300. The change in size of the application interface 308 can be caused by a user of the computing device 304 or a software operation of the computing device 304. Once the change in size of the application interface 308 is initiated, the host device of the computing device 304 can cause a TCON of the computing device 304 to enter a PSR mode as discussed herein. Thereafter, the host device can reconfigure a scaler of the TCON to output more image data for the larger application interface 308 of the second state 302. During this time, the TCON can drive the display panel of the computing device 304 using an image frame stored by the TCON to allow for a seamless transition between the first state 300 and the second state 302. Once the TCON has been reconfigured by the host device, the TCON can exit the PSR mode and the host device can drive the display panel while the application interface 308 is operating in the second state 302.

Figure 4:
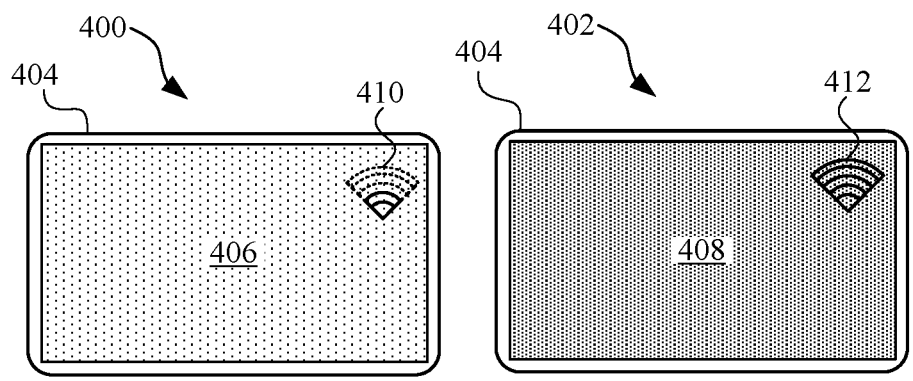

FIG. 4 illustrates a scenario where a resolution or scaling of a video stream changes in part because of a change in signal quality or signal strength has been detected by a computing device 404. In other embodiments, the resolution or scaling of a video stream can change in response to detecting a peripheral device (e.g., a stylus, speaker, microphone, charger, other computing device) using a wireless communication between the computing device 404 and the peripheral device. While in a first state 400, the computing device 404 can operate at a first signal strength 410, which refers to an icon for indicating signal strength or signal quality. The first signal strength 410 can correspond to the signal strength or signal quality of a cellular connection, a local area connection, a wide area connection, a Bluetooth connection, a wireless power supply connection, and/or any other wireless connection suitable for use by a device. While operating with the first signal strength 410, a display panel 406 (e.g., such as display panel 208) of the computing device 404 can operate at a first resolution. When the signal strength changes to a second signal strength 412 that is greater than the first signal strength 410, the display panel 406 can operate according to a second resolution that is greater than the first resolution. The transition between the first resolution and the second resolution can be controlled in part by a host device and a TCON of the computing device 404 as discussed herein.

Figure 5:
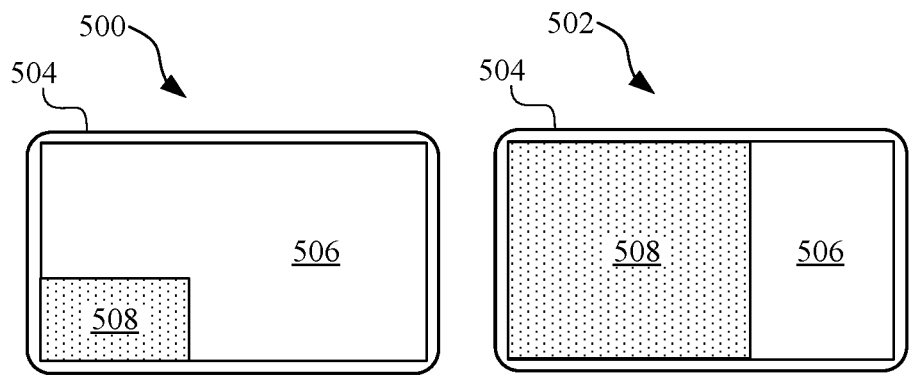

FIG. 5 illustrates a scenario where a resolution of a portion of a display panel 506 of a computing device 504 changes in response to an application interface 508 scaling or otherwise changing dimensions. When in a first state 500, the application interface 508 can fill a first area of the display panel 506. In a second state 502, the application interface 508 can fill a second area of the display panel 506 that is greater than the first area of the display panel 506, as illustrated in FIG. 5. Before scaling or changing dimensions of the application interface 508, a host device and TCON of the computing device 504 can ensure that a seamless transition occurs according to the embodiments discussed herein. For example, in response to a command for changing the dimensions of the application interface 508, the host device can cause the TCON to enter a PSR mode so that a scaler of the TCON can be reconfigured, as discussed herein. Once the scaler is reconfigured, the TCON can exit the PSR mode and the display panel 506 can be driven according to the new configuration of the scaler. In this way, a seamless transition will occur when scaling the application interface 508, as further discussed herein.

Figure 6:
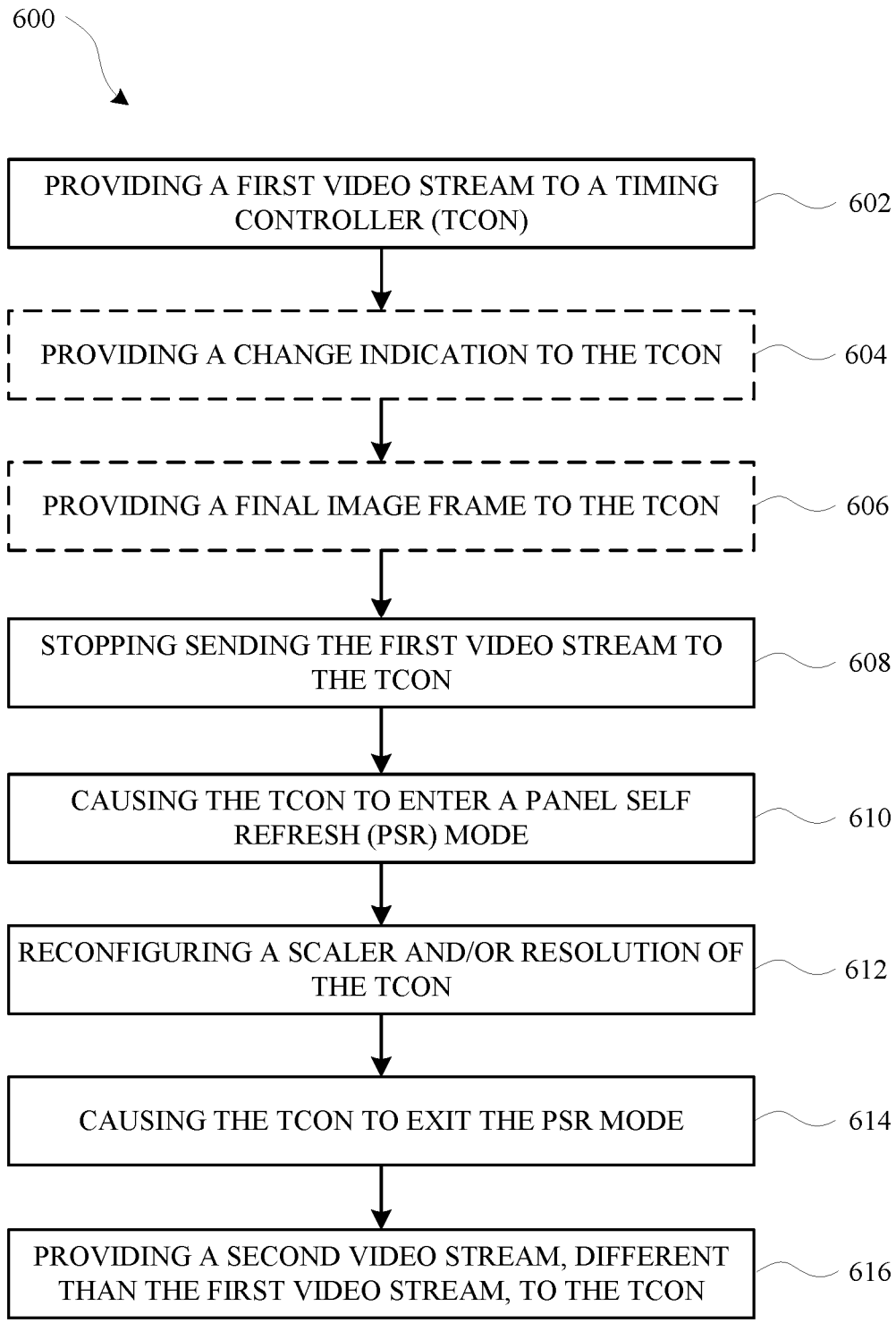
FIG. 6 illustrates a method for performing a seamless video transition as discussed herein.

FIG. 6 illustrates a method 600 for seamlessly transitioning between two different video streams. The method 600 can be performed by a host device such as a GPU, a display controller such as a TCON, a display device, a computing device, or any other device suitable for controlling a video stream. The method 600 can be embodied as instructions stored in a non-transitory computer readable medium of a computing, and the instructions can be modified according to any of the details provided in this disclosure. The method 600 can include a step 602 of providing a first video stream to a timing controller (TCON). At step 604, which is an optional step, a change indication can be provided to the TCON. The method 600 can further include an optional step 606 of providing a final image frame to the TCON. At step 608, the first video stream to the TCON is stopped from being sent. At step 610, the TCON is caused to enter a panel self refresh (PSR) mode, in which the TCON can drive a display panel using the final image frame, or an image frame stored in a memory of the TCON. At step 612, a scaler and/or resolution associated with the TCON can be reconfigured while the TCON is operating in the PSR mode. At step 614, the TCON can be caused to exit the PSR mode after the reconfiguring of the TCON has completed. At step 616, a second video stream, different than the first video stream, can be provided to the TCON. The second video stream can be associated with a different resolution or different video dimensions compared to the first video stream.

Figure 7:
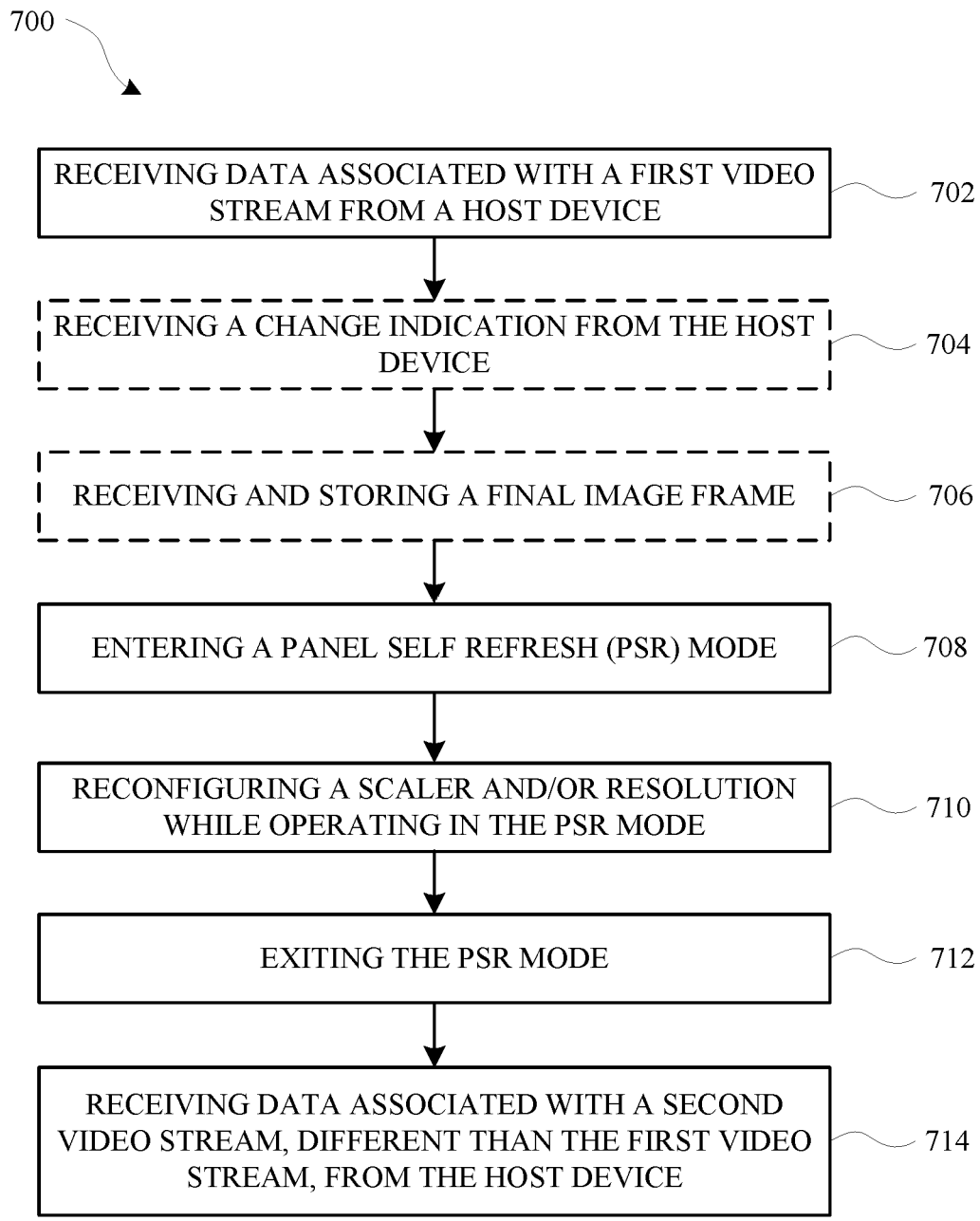
FIG. 7 illustrates another method for performing a seamless video transition as discussed herein.

FIG. 7 illustrates a method 700 for seamlessly transitioning between two different video streams. The method 700 can be performed by a host device such as a GPU, a display controller such as a TCON, a display device, a computing device, or any other device suitable for controlling a video stream. The method 700 can be embodied as instructions stored in a non-transitory computer readable medium of a computing, and the instructions can be modified according to any of the details provided in this disclosure. The method 700 can include a step 702 of receiving data associated with a first video stream from a host device, such as a GPU. At step 704, which is an optional step of method 700, a change indication is received from the host device indicating that there will be a change to the video stream. At step 706, which is another optional step of method 700, a final image frame is received from the host device and stored in a memory of the device performing method 700 (e.g., a timing controller). At step 708, a panel self refresh (PSR) mode is entered into. At step 710, a scaler and/or resolution is modified or reconfigured while operating in the PSR mode. At step 712, the PSR mode is exited out of. At step 714, data associated with a second video stream, that is different than the first video stream, is received from the host device. The second video stream can differ from the first video stream in that the second video stream can have a different resolution and/or different dimensions.

Figure 8:
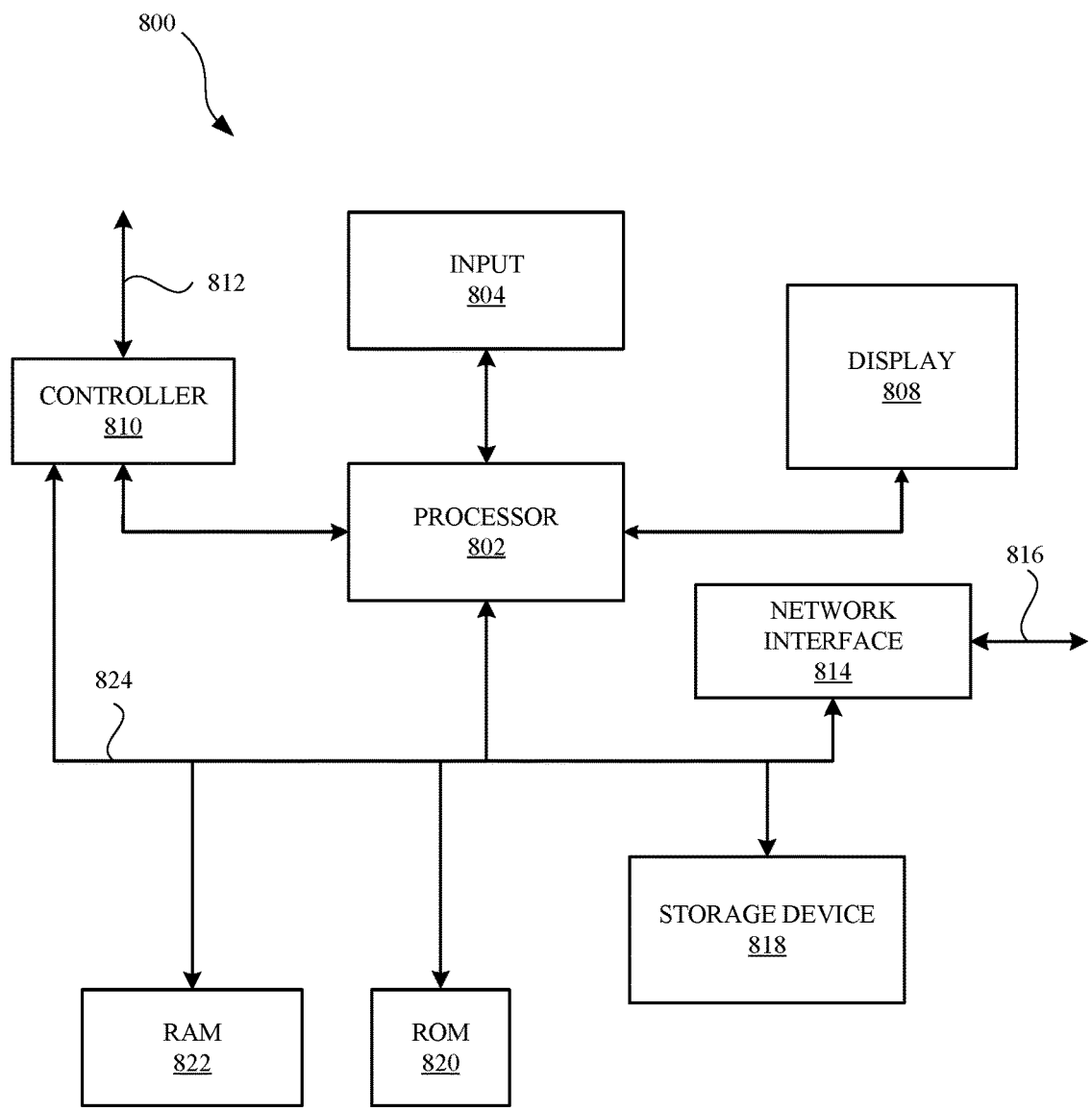
FIG. 8 illustrates a computing device that can be used to perform seamless video transitions as discussed herein.

FIG. 8 is a block diagram of a computing device 800 that can represent the components of the computing devices, display panels, or any of the systems, apparatus, and/or modules discussed herein. It will be appreciated that the components, devices or elements illustrated in and described with respect to FIG. 8 may not be mandatory and thus some may be omitted in certain embodiments. The computing device 800 can include a processor 802 that represents a microprocessor, a coprocessor, circuitry and/or a controller for controlling the overall operation of computing device 800. Although illustrated as a single processor, it can be appreciated that the processor 802 can include a number of processors. The number of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include a display 808 (screen display) that can be controlled by processor 802 to display information to a user. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a number of disks (e.g., hard drives) and a storage management module that manages one or more partitions (also referred to herein as "logical volumes") within the storage device 818. In some embodiments, the storage device 818 can include flash memory, semiconductor (solid state) memory or the like. Still further, the computing device 800 can include Read-Only Memory (ROM) 820 and Random Access Memory (RAM) 822. The ROM 820 can store programs, code, instructions, utilities or processes to be executed in a non-volatile manner. The RAM 822 can provide volatile data storage, and store instructions related to components of the storage management module that are configured to carry out the various techniques described herein. The computing device 800 can further include data bus 824. Data bus 824 can facilitate data and signal transfer between at least processor 802, controller 810, network interface 814, storage device 818, ROM 820, and RAM 822.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for transitioning resolution of a display device, the method comprising:

receiving a first video stream having a first resolution at a timing controller of the display device, at least a frame of the first video stream being stored in the timing controller;

receiving a command for a change of resolution from the first resolution to a second resolution;

in response to the command, entering into a panel self refresh mode and driving the display device using the stored frame;

during the panel self refresh mode, reconfiguring a scaler of the timing controller to change a driving setting for pixel arrays of the display device for the second resolution; and receiving a second video stream having the second resolution and driving the display device according to the second video stream and the reconfigured scaler.

2. The method of claim 1, wherein a final frame of the first video stream corresponds to a scaled version of an initial frame of the second video stream in order that a seamless video transition occurs at the display device.

3. The method of claim 1, further comprising:
   sending an acknowledgement in response to the entering into the panel self refresh mode.

4. The method of claim 1, wherein the driving of the display device using the second video stream is controlled by a first clock and the panel self refresh mode is controlled by a second clock that is different than the first clock.

5. The method of claim 4, wherein during the panel self refresh mode, the first clock is reconfigured.

6. The method of claim 4, wherein the first clock is associated with the scaler and the second clock is independent of the scaler.

7. The method of claim 1, wherein the stored frame corresponds to a scaled version of an initial image frame of the second video stream.

8. A timing controller (TCON) configured to drive a display panel, the TCON comprising:
   a scaler configured to drive the display panel;
   a first clock control associated with the scaler; and
   a second clock control for a panel self refresh (PSR) mode, the second clock control being independent of the scaler;
   wherein the TCON is capable of reconfiguring the scaler during the PSR mode, and during the reconfiguration, the TCON:
   switches to the PSR mode, bypasses the scaler and the first clock control, drives the display panel using the second clock control, and modifies the scaler and the first clock control.

9. The TCON of claim 8, wherein the TCON is further configured to receive a video stream before the TCON is operating in the PSR mode and bypass receiving the video stream when the TCON is operating in the PSR mode.

10. The TCON of claim 9, wherein the TCON is further configured to receive an updated video stream after the TCON exits the PSR mode.

11. The TCON of claim 8, wherein the TCON further comprises a memory, and is further configured to store an image frame in the memory in order that the TCON will drive the display panel with the image frame while operating in the PSR mode.

12. The TCON of claim 8, wherein modifying the scaler of the TCON causes the scaler to output more or less image data.

13. The TCON of claim 8, wherein the second clock control is connected to a buffer manager storing an image frame for the PSR mode.

14. The TCON of claim 8, wherein the TCON is configured to provide a confirmation to a host device when the TCON exits the PSR mode.

15. A system comprising:
a display panel;
a timing controller (TCON) comprising a memory and configured to operate in a panel self refresh (PSR) mode and alternatively a normal mode;
a first clock control driving the TCON in the normal mode;
a second clock control driving the TCON in the PSR mode, the second clock control being independent of the first clock control;
a host device in communication with the TCON and configured to cause the TCON to transition between the normal mode and the PSR mode when a resolution of a video stream output by the host device changes,
wherein in the PSR mode, the TCON, according to the second clock control, drives the display panel using an image frame stored in the memory during a previous normal mode; and
in the normal mode, the TCON, according to the first clock control, drives the display panel based on the video stream transmitted by the host device.

16. The system of claim 15, wherein the image frame stored is a last frame of the video stream provided by the host device to the TCON before the resolution of the video stream changes.

17. The system of claim 16, wherein the image frame stored is a different resolution than a first image frame of an updated video stream provided by the host device after the TCON exits the PSR mode.

18. The system of claim 15, wherein the TCON includes a scaler and the host device is configured to modify the scaler when the TCON is operating in the PSR mode.

19. The system of claim 18, wherein the first clock control is associated with the scaler while the second clock control is independent of the scaler.

20. The system of claim 15, wherein a first frame of the normal mode is a same base image of a last frame of the previous normal mode with a different image resolution.

* * * * *